(12) United States Patent
Ogawa (10) Patent No.: US 12,043,563 B2
(45) Date of Patent: Jul. 23, 2024

(54) THERMOPLASTIC PLATE BENDING METHOD, WORKING JIG, AND CONCAVE THERMOPLASTIC PLATE

(71) Applicant: SANKO SEIKOSHO CO., LTD., Tokyo (JP)

(72) Inventor: Hiroshi Ogawa, Tokyo (JP)

(73) Assignee: SANKO SEIKOSHO CO., LTD., Tokyo (JP)

( * ) Notice: Subject to any disclaimer, the term of this patent is extended or adjusted under 35 U.S.C. 154(b) by 667 days.

(21) Appl. No.: 17/256,033

(22) PCT Filed: Dec. 28, 2018

(86) PCT No.: PCT/JP2018/048604
§ 371 (c)(1),
(2) Date: Dec. 24, 2020

(87) PCT Pub. No.: WO2020/136909
PCT Pub. Date: Jul. 2, 2020

(65) Prior Publication Data
US 2021/0122661 A1 Apr. 29, 2021

(51) Int. Cl.
*C03B 23/025* (2006.01)
*C03B 23/00* (2006.01)
(Continued)

(52) U.S. Cl.
CPC ........ *C03B 23/025* (2013.01); *C03B 23/0086* (2013.01); *B29C 51/00* (2013.01);
(Continued)

(58) Field of Classification Search
None
See application file for complete search history.

(56) References Cited

U.S. PATENT DOCUMENTS

| | | | | |
|---|---|---|---|---|
| 417,097 | A | * 12/1889 | Scott | .................. C03B 23/0252 65/374.11 |
| 760,959 | A | * 5/1904 | Connington | ........ C03B 23/0256 65/273 |

(Continued)

FOREIGN PATENT DOCUMENTS

| | | | | |
|---|---|---|---|---|
| DE | 2231512 | A1 * | 1/1974 | ......... C03B 23/0252 |
| DE | 102011050628 | A1 * | 11/2012 | ......... C03B 23/0256 |

(Continued)

OTHER PUBLICATIONS

Machine Translation of DE-102011050628-A1, Nov. 2012 (Year: 2012).*

(Continued)

*Primary Examiner* — Jeffrey A Vonch
(74) *Attorney, Agent, or Firm* — Locke Lord LLP (57) ABSTRACT

There is provided a method for heating a thermoplastic plate to be subjected to bending which is horizontally arranged while holding at least part of a peripheral edge portion of the thermoplastic plate, causing a portion inside the peripheral edge portion to sag under a self-weight, and bending the thermoplastic plate to a desired curvature. The method includes applying tension in a planar direction of the thermoplastic plate at the time of holding at least the part of the peripheral edge portion of the thermoplastic plate in a molding frame defining a peripheral edge shape in a shape as a goal for reshaping. Since the thermoplastic plate is pulled in the planar direction during the heating of the thermoplastic plate, moderate tension acts on the thermoplastic plate to prevent breakage. The degree of curvature of the thermoplastic plate can be adjusted by adjusting the mass of each weight.

8 Claims, 8 Drawing Sheets

(51) Int. Cl.
  *B29C 51/00* (2006.01)
  *B29C 51/18* (2006.01)
  *B29C 53/04* (2006.01)
(52) U.S. Cl.
  CPC .............. *B29C 51/18* (2013.01); *B29C 53/04* (2013.01); *C03B 23/0252* (2013.01); *C03B 23/0256* (2013.01); *Y10S 65/00* (2013.01); *Y10T 428/24628* (2015.01)

(56) References Cited

U.S. PATENT DOCUMENTS

| | | | | | |
|---|---|---|---|---|---|
| 1,999,558 | A | * | 4/1935 | Black | C03B 23/0256 65/289 |
| 2,176,999 | A | * | 10/1939 | Miller | C03B 23/0258 65/273 |
| 2,213,406 | A | * | 9/1940 | Paddock | C03B 23/0252 501/141 |
| 2,218,654 | A | * | 10/1940 | Paddock | C03B 23/0252 65/273 |
| 2,223,123 | A | * | 11/1940 | Owen | C03B 23/0252 65/287 |
| 2,261,033 | A | * | 10/1941 | Marshall | C03B 23/0252 65/181 |
| 2,452,488 | A | * | 10/1948 | Paddock | C03B 23/0258 65/273 |
| 2,500,278 | A | * | 3/1950 | Dunipace | C03B 23/0256 65/286 |
| 2,695,476 | A | * | 11/1954 | Jendrisak | C03B 23/027 65/290 |
| 2,702,445 | A | * | 2/1955 | Jendrisak | C03B 23/0252 65/289 |
| 2,736,140 | A | * | 2/1956 | Black | C03B 23/027 65/285 |
| 2,758,422 | A | * | 8/1956 | Jendrisak | C03B 23/0252 65/289 |
| 2,869,287 | A | * | 1/1959 | Bamford | C03B 23/027 65/273 |
| 3,248,517 | A | * | 4/1966 | Vranken | C03B 23/0258 65/285 |
| 4,002,450 | A | * | 1/1977 | Hamilton | C03B 23/0256 65/288 |
| 4,018,589 | A | * | 4/1977 | Egbert | C03B 23/0252 65/287 |
| 4,072,493 | A | * | 2/1978 | Imler | C03B 23/027 65/288 |
| 4,302,417 | A | * | 11/1981 | Michelotti | C03B 23/0252 425/383 |
| 4,375,978 | A | * | 3/1983 | Reese | C03B 23/0252 65/287 |
| 4,755,204 | A | * | 7/1988 | Boardman | C03B 29/08 65/273 |
| 5,009,693 | A | * | 4/1991 | Freidel | C03B 35/185 65/273 |
| 5,084,226 | A | * | 1/1992 | Tarlton | B29C 51/26 264/2.7 |
| 5,100,454 | A | * | 3/1992 | Mathivat | C03B 29/08 65/273 |
| 5,137,562 | A | * | 8/1992 | Reunamaki | C03B 23/0252 65/273 |
| 5,141,550 | A | * | 8/1992 | Reunamaki | C03B 23/0258 65/273 |
| 5,194,083 | A | * | 3/1993 | Lehto | C03B 29/025 65/273 |
| 5,437,704 | A | * | 8/1995 | Yli-Vakkuri | B32B 17/10889 65/273 |
| 5,679,123 | A | * | 10/1997 | Bennett | C03B 23/0258 65/273 |
| 6,076,374 | A | * | 6/2000 | Lammi | C03B 23/0252 65/273 |
| 2003/0154746 | A1 | * | 8/2003 | Lammi | C03B 35/202 65/273 |
| 2005/0092026 | A1 | * | 5/2005 | Merola | C03B 23/0252 65/287 |
| 2006/0230790 | A1 | * | 10/2006 | Yli-Vakkuri | C03B 23/03 65/273 |
| 2011/0115128 | A1 | * | 5/2011 | Bochinger | B29C 53/04 264/322 |
| 2012/0086150 | A1 | * | 4/2012 | De Mattia | B29C 70/32 425/402 |
| 2013/0000357 | A1 | * | 1/2013 | Sounni | C03B 23/0026 65/287 |
| 2013/0160495 | A1 | | 6/2013 | Berrada Sounni et al. | |
| 2014/0308464 | A1 | * | 10/2014 | Levasseur | B32B 17/10788 29/447 |
| 2015/0151507 | A1 | * | 6/2015 | Edelmann | B32B 3/06 156/196 |
| 2015/0258743 | A1 | * | 9/2015 | Lanard | B29C 70/541 425/500 |
| 2017/0100875 | A1 | * | 4/2017 | Eo | B29C 51/46 |
| 2020/0325057 | A1 | * | 10/2020 | Burdette | C03B 23/0252 |
| 2020/0346965 | A1 | * | 11/2020 | Machura | C03B 23/03 |
| 2021/0002169 | A1 | * | 1/2021 | Gremmelspacher | C03B 23/0258 |
| 2021/0309557 | A1 | * | 10/2021 | Gremmelspacher | B32B 17/10871 |

FOREIGN PATENT DOCUMENTS

| | | | | |
|---|---|---|---|---|
| DE | 102012010497 | A1 | * 12/2012 | ............ B29C 70/56 |
| DE | 102012107968 | A1 | * 3/2014 | ......... C03B 23/0252 |
| DE | 102014010173 | A2 | * 1/2015 | .......... B29C 51/421 |
| EP | 187598 | A2 | * 7/1986 | |
| EP | 976688 | A1 | * 2/2000 | ............ C03B 23/03 |
| EP | 2679550 | A1 | * 1/2014 | ......... C03B 23/0252 |
| FI | 881079 | A | * 9/1989 | |
| FR | 412231 | A | * 10/1910 | |
| GB | 1452731 | A | * 10/1976 | ......... C03B 23/0258 |
| GB | 1589441 | A | * 5/1981 | ........... C03B 23/027 |
| JP | S55-007507 | A | 1/1980 | |
| JP | 06211532 | A | * 8/1994 | ......... C03B 23/0305 |
| JP | 06219759 | A | * 8/1994 | ......... C03B 23/0258 |
| JP | 06065442 | U | * 9/1994 | |
| JP | 2004-502631 | A | 1/2004 | |
| JP | 2004203676 | A | * 7/2004 | ......... C03B 23/0258 |
| JP | 2015-505294 | A | 2/2015 | |
| KR | 940001145 | Y1 | * 10/1992 | |
| KR | 940000584 | Y1 | * 2/1994 | |
| KR | 2015005098 | A | * 1/2015 | |
| RU | 2096352 | C1 | * 11/1997 | ......... C08B 23/0258 |
| RU | 2515658 | C1 | * 5/2014 | |
| WO | WO-9728095 | A1 | * 8/1997 | ......... C03B 23/0258 |
| WO | WO-2015113595 | A1 | * 8/2015 | ......... C03B 23/0252 |

OTHER PUBLICATIONS

Machine Translation of FR-412231-A, Oct. 1910 (Year: 1910).*
International Search Report mailed Apr. 9, 2019, issued for PCT/JP2018/048604.

* cited by examiner

THERMOPLASTIC PLATE BENDING METHOD, WORKING JIG, AND CONCAVE THERMOPLASTIC PLATE

TECHNICAL FIELD

The present invention relates to a thermoplastic plate bending method, a working jig, and a concave thermoplastic plate.

BACKGROUND ART

Conventional techniques for subjecting a glass plate which is a large-area thermoplastic plate to curving and forming a surface into a paraboloid or the like include a method that heats and softens a glass plate while holding a perimeter of the glass plate and causes the glass plate to curve under its self-weight. A glass plate thus formed is applied to a large concave mirror or the like and has various uses, such as a large telescope, a large projection device, or a reflecting mirror for a large projector.

Patent Literature 1 discloses a glass plate shaping method that causes a glass plate to be shaped to sag at a central portion under its self-weight by subjecting the glass plate to heat treatment for softening while the glass plate is held almost horizontally from below with an end edge portion free and shapes the glass plate like a curved surface.

Patent Literature 2 discloses a glass plate bending method in a glass bending furnace utilizing the action of gravity and a bending mold. The method is intended to put the glass plate on the bending mold, heat the glass plate to a bending temperature, and bend glass to a desired shape with the bending mold. A glass edge portion of the unbent glass plate is supported by mold supports provided below the glass edge portion, and other mold supports are provided at a final shaping position. In the method, a middle portion of the unbent glass plate is further supported by a mold middle component, the adjustable middle component of the bending mold is lowered during glass bending to lift down the glass plate to mold supports, and the middle component lowered by the process forms part of the final bending mold.

PRIOR ART LITERATURE

Patent Literature

Patent Literature 1: Japanese Unexamined Patent Application Publication No. 55-007507
Patent Literature 2: Japanese Unexamined Patent Application Publication (Translation of PCT Application) No. 2004-502631

SUMMARY OF THE INVENTION

Problems to be Solved by the Invention

In recent years, reduction in weight has been achieved by subjecting as thin a glass plate as possible to bending at the time of creation of a large reflecting mirror and reinforcing the bent glass plate with a honeycomb structure. Conventional bending methods including Patent Literature 1, however, suffer the problem below. When a large-size thin glass plate (for example, about 3 mm thick) is to be subjected to bending, just setting the glass plate on a jig may cause the glass plate to break under its self-weight, which prevents satisfactory bending.

The method according to Patent Literature 2 supports a middle portion of a glass plate with the mold middle component to allow lowering during working and suffers the problems below. A mechanism for moving the mold middle component needs to be provided inside the mold, which complicates a jig. The position of the mold middle component needs to be synchronized to a bent state of a glass plate, which makes control troublesome. The middle component may cause degradation in shape.

The present invention has been made in view of the above-described problems, and has as its object to provide a thermoplastic plate bending method capable of preventing a thermoplastic plate, including a large-size thin glass plate, from breaking under a self-weight and efficiently working on the thermoplastic plate with high accuracy at the time of heating the thermoplastic plate and causing the thermoplastic plate to curve to a predetermined curved surface (for example, a paraboloid) under the self-weight, a working jig, and a concave thermoplastic plate.

Means to Solve the Problems

A thermoplastic plate bending method according to the present invention is a method for heating a thermoplastic plate to be subjected to bending which is horizontally arranged while holding at least part of a peripheral edge portion of the thermoplastic plate, causing a portion inside the peripheral edge portion to sag under a self-weight, and bending the thermoplastic plate to a desired curvature. The thermoplastic plate bending method includes applying tension in a planar direction of the thermoplastic plate at the time of holding the at least part of the peripheral edge portion of the thermoplastic plate in a molding frame defining a peripheral edge shape in a shape as a goal for reshaping.

According to the thermoplastic plate bending method of the present invention, a concave mold is arranged below the thermoplastic plate.

According to the thermoplastic plate bending method of the present invention, a weight is used to apply the tension.

A jig according to the present invention is a jig used at the time of putting a thermoplastic plate in a heated state and subjecting the thermoplastic plate to bending under a self-weight. The jig includes a frame body which is in contact with at least part of a peripheral edge of the thermoplastic plate and holds the thermoplastic plate, and tension generation means for pulling the peripheral edge of the thermoplastic plate and applying tension in a planar direction.

The jig of the present invention further includes a concave mold which is arranged below the frame body.

According to the jig of the present invention, magnitude of the tension is variable.

According to the jig of the present invention, the tension generation means includes a plurality of weights which are arranged around the frame body, linear members which connect the weights and the peripheral edge of the thermoplastic plate, and a direction change member which is attached to the frame body and changes force in a vertical direction due to the weights, for which the linear members are arranged, into tensile force in the planar direction for the thermoplastic plate.

According to the present invention, there is provided a concave thermoplastic plate which is curved under a self-weight in a heated state where tension is applied in a planar direction.

Effects of the Invention

According to the thermoplastic plate bending method, the working jig, and the concave thermoplastic plate of the present invention, since the thermoplastic plate is pulled in the planar direction during heating of the thermoplastic plate, moderate tension acts on the thermoplastic plate to prevent breakage. The degree of curvature of the thermoplastic plate can be adjusted by adjusting the mass of each weight. Thus, an accurate concave thermoplastic plate can be manufactured at a high yield.

That is, according to the thermoplastic plate bending method of the present invention, since the thermoplastic plate is heated while tension is applied in the planar direction of the thermoplastic plate, moderate tension acts on the thermoplastic plate to prevent breakage. Additionally, tension acts even during heating, which allows prevention of rapid deformation of the thermoplastic plate.

According to the thermoplastic plate bending method of the present invention, since the concave mold is arranged below the thermoplastic plate, the thermoplastic plate can be shaped to have a desired shape following the concave mold with high accuracy.

According to the thermoplastic plate bending method of the present invention, it is possible to apply accurate tension to the thermoplastic plate even when the jig is heated in a state where the jig is arranged in a heating furnace, without need for a large-scale device or large-scale equipment.

According to the jig of the present invention, it is possible to apply the tension to the thermoplastic plate in the planar direction with the tension generation means at the time of arranging the thermoplastic plate in the frame body and heating the thermoplastic plate. Thus, moderate tension acts on the thermoplastic plate to prevent breakage. Additionally, tension acts even during heating, which allows prevention of rapid deformation of the thermoplastic plate.

The jig of the present invention further includes the concave mold arranged below the frame body. Thus, the thermoplastic plate can be shaped to have a desired shape following the concave mold.

According to the jig of the present invention, since tension can be changed as needed, optimum tension can be selected in accordance with a size of the thermoplastic plate, the degree of curvature, and a heated state. For this reason, the degree of curvature of the thermoplastic plate can be adjusted by adjusting the mass of each weight. Thus, an accurate curved thermoplastic plate can be manufactured at a high yield.

According to the jig of the present invention, the tension generation means changes downward force in the vertical direction with which the weights are gravitationally pulled to a horizontal direction with the direction change member and pulls the thermoplastic plate in the planar direction via the linear members. Thus, it is possible to apply accurate tension to the thermoplastic plate even when the jig is heated in a state where the jig is arranged in a heating furnace, without need for a large-scale device or large-scale equipment.

According to the concave thermoplastic plate of the present invention, it is possible to easily form a thin thermoplastic plate as a material into an accurately shaped thermoplastic plate with high efficiency.

BRIEF DESCRIPTION OF THE DRAWINGS

FIG. 1(a) and FIG. 1(b) illustrate a jig according to an embodiment of the present invention.

FIG. 2(a) and FIG. 2(b) illustrate the jig.

FIGS. 3(a) (d) illustrate application of tension to a glass plate in a glass plate bending method according to the embodiment of the present invention.

DETAILED DESCRIPTION OF THE EMBODIMENTS

A thermoplastic plate bending method, a working jig, and a concave thermoplastic plate according to an embodiment of the present invention will be described.

A thermoplastic plate bending method according to an embodiment uses, as a thermoplastic plate, a glass plate (common glass: soda glass). For example, a rectangular glass plate having a thickness of 3 mm and a size of, for example, 1 by 2 m or 100 by 150 inches is adopted as an object to be worked on. A radius of curvature of a glass plate after bending is set to, for example, 3.3 m.

Note that the size, shape, and thickness of a glass plate are not limited to the above-described examples. For example, a glass plate in a circular shape or any other shape, a glass plate having a thickness less or more than 3 mm, a large or small glass plate, or a glass plate of any other material can be adopted as an object. A radius of curvature after working can also be freely set. In addition to a glass plate, a thermoplastic plate of synthetic resin can be adopted as an object of bending.

At the time of working on a glass plate as described above, the glass plate may break under its self-weight in a state where a perimeter is held by a molding frame.

A glass plate bending method according to the present embodiment horizontally holds a glass plate using the jig to be described below, and arranges the jig holding the glass plate in a large heating furnace and heats the jig, thereby subjecting the glass plate to bending under its self-weight.

First Embodiment

Figure 1:
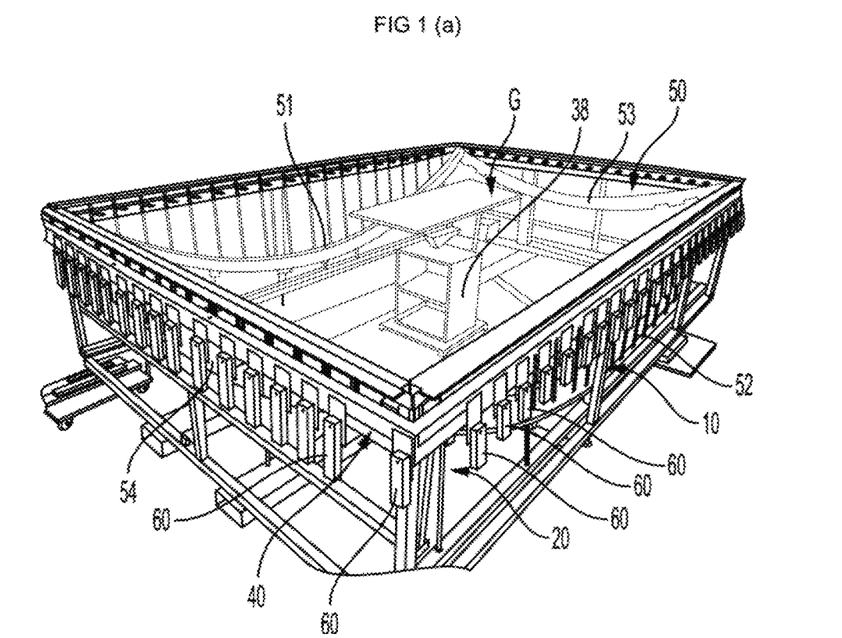
FIG. 1(a) is a photograph showing a pre-heating state in which a glass plate is arranged in a frame body.
FIG. 1(b) is a perspective view showing the frame body in the jig.
Figure 2:
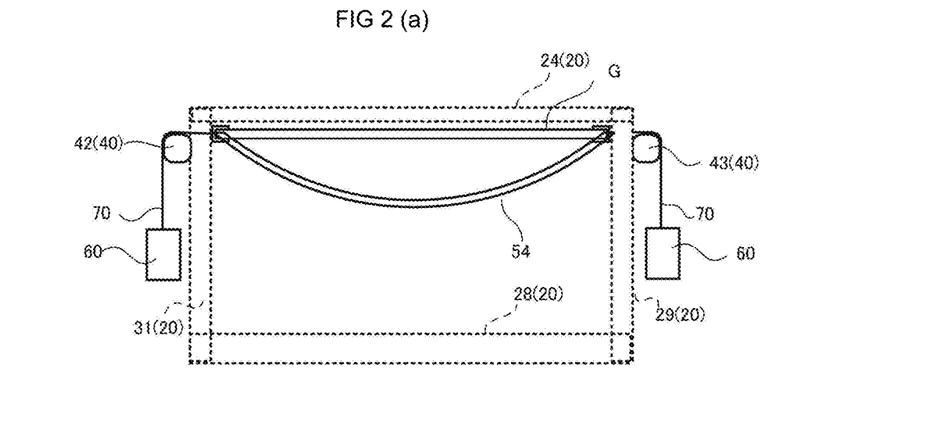
FIG. 2(a) is a schematic view corresponding to a cross-section taken along line A-A in FIG. 1(b)
FIG. 2(b) is a schematic view corresponding to a cross-section taken along line D-D in FIG. 1(b).
Figure 3:
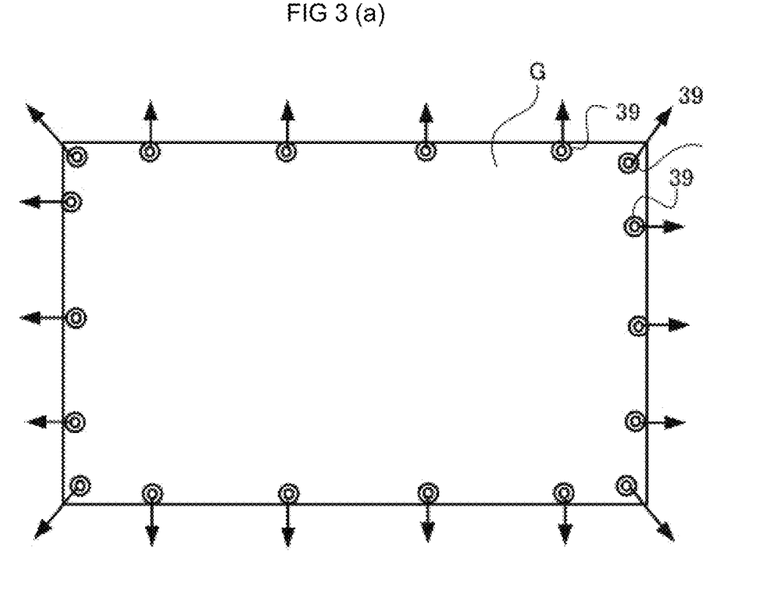
FIG. 3(a) is a plan view showing a tensioned state.
FIG. 3(b) is a front view of the tensioned state.
FIG. 3(c) is a side view of the tensioned state.
FIG. 3(d) is a schematic view showing tension generation means of the jig.

A jig according to an embodiment will be described below. FIG. 1(a) and FIG. 1(b) illustrate the jig according to the embodiment of the present invention, FIG. 1(a) is a photograph showing a pre-heating state in which a glass plate is arranged in a frame body, and FIG. 1(b) is a perspective view showing the frame body in the jig. FIG. 2(a) and FIG. 2(b) illustrate the jig, FIG. 2(a) is a schematic view corresponding to a cross-section taken along line A-A in FIG. 1(b), and FIG. 2(b) is a schematic view corresponding to a cross-section taken along line D-D in FIG. 1(b). FIGS. 3(a)-(d) illustrate application of tension to the glass plate in a glass plate bending method according to the embodiment of the present invention, FIG. 3(a) is a plan view showing a tensioned state, FIG. 3(b) is a front view of the tensioned state, FIG. 3(c) is a side view of the tensioned state, and FIG. 3(d) is a schematic view showing tension generation means of the jig.

A jig 10 according to the present embodiment is composed of a molding frame 20, in which a glass plate G as an object to be worked on is horizontally placed on an upper side, and tension generation means for applying tension in a planar direction to the glass plate G. In the present embodiment, the tension generation means is configured to include a frame body 40 which is a direction change member arranged to surround the molding frame 20, weights 60, and wires 70 which are linear members.

As shown in FIGS. 1(a) and 1(b), the molding frame 20 is a frame body in the shape of a rectangular parallelepiped which is made of steel. That is, the molding frame 20 includes four upper frame bodies 21, 22, 23, and 24 which constitute an upper edge line and four lower frame bodies 25, 26, 27, and 28 which constitute a lower edge line. The molding frame 20 also includes four vertical frame bodies 29, 30, 31, and 32 which constitute vertical edge lines and couple the upper frame bodies 21, 22, 23, and 24 and the lower frame bodies 25, 26, 27, and 28.

The molding frame 20 also includes reinforcing members, such as lower portion reinforcing members 33 and 34, vertical members 35, long-side vertical crosspieces 36, and short-side vertical crosspieces 37, as appropriate. The glass plate G can be arranged inside the upper frame bodies 21, 22, 23, and 24 of the molding frame 20. Note that, in the photograph shown in FIG. 1(a), a support member 38 which temporarily supports a lower surface of the glass plate G arranged in the molding frame 20 is arranged. The support member 38 is removed before heating.

Inside the molding frame 20, arc-shaped frames 51, 52, 53, and 54, on which four corners of the glass plate G are arranged and which are shaped to suit the shapes of four sides of the glass plate G after bending, are arranged. Radii of the arc-shaped frames 51, 52, 53, and 54 conform to radii and the shape of the glass plate G after working. As shown in FIG. 1(b), edge portions of the arc-shaped frames 51, 52, 53, and 54 are coupled such that the four corners of the glass plate G can be set. Note that the arc-shaped frames 51 and 52 along long sides and the arc-shaped frames 53 and 54 along short sides have different radii.

The present example assumes that the rectangular glass plate G is subjected to bending to form part of a paraboloid. For this reason, the long sides and the short sides of the bent glass plate G are not linear and form circular arcs in predetermined shapes (parabolas). The arc-shaped frames 51, 52, 53, and 54 are shaped to suit the circular arcs. This allows a large rectangular glass plate to be bent to a shape forming part of a large paraboloid having a predetermined radius of curvature. A giant concave mirror can be formed by appropriately reshaping bent glass plates G and combining the glass plates G.

As shown in FIGS. 1(a), 2(a)-(b), and 3(d), the tension generation means is configured to include the frame body 40, the weights 60, and the wires 70 and applies tensile force to the glass plate G.

In this example, the frame body 40 is composed of four frame materials 41, 42, 43, and 44 which are obtained by assembling square steel pipes to form a rectangle. As shown in FIG. 1(a), a total of 82 weights 60 are arranged with 17 weights 60 on each glass short side and, for example, 24 weights 60 on each long side.

A total mass for the weights 60 is set to, for example, about 100% of the mass of a glass plate and is equally divided. That is, if the mass of a glass plate is 200 kg, the total mass for the weights 60 is set to 200 kg. In this case, the mass of each weight 60 is about 2.4 kg. Note that the number of weights 60 and the mass of each weight 60 vary depending on a bending condition and a treatment condition for the glass plate G and can be appropriately changed.

As shown in FIGS. 1(a) and 2(a)-(b), the wires 70 are provided so as to correspond to the weights 60. A distal end of the wire 70 is coupled to an end portion of the glass plate G, the other end is coupled to the weight 60, and the wire 70 is slung over the frame body 40. A force with which the weight 60 is pulled in a vertical direction is changed in direction to the planar direction (a horizontal direction) of the glass plate G, as shown in FIGS. 3(a), 3(b), and 3(c). In the present embodiment, as shown in FIG. 3(a), protruding members 39 are provided at the four corners of the glass plate G to pull the four corners of the glass plate G outward in a diagonal direction. The weights 60 are drawn in the drawing such that the number thereof is smaller than it really is.

The protruding member 39 is arranged on the glass plate G with heat-resistant glue such that the distal end of the wire 70 can be coupled. The wire 70 and the glass plate G can be coupled by another method. For example, the wire 70 can be arranged by forming a hole in an end edge portion of the glass plate G. As shown in FIG. 2(a) and FIG. 2(b), the wires 70 are connected to the glass plate G to extend horizontally, pass between the vertical members 35, the long-side vertical crosspieces 36, and the short-side vertical crosspieces 37, are changed in direction by the frame body 40, extend downward, and hold the weights 60 vertically suspended therefrom.

For the above-described reason, the wires 70 pull the glass plate G in the horizontal direction while following lowering of the frame body 40 accompanying lowering of a peripheral edge portion associated with curvature of the glass plate G. The weights 60 stop lowering in a state where the peripheral edge portion of the glass plate G is in contact with the arc-shaped frames 51, 52, 53, and 54.

In the present embodiment, the frame body 40 fits on an outer side of the molding frame 20 and is capable of moving vertically. The frame body 40 can be moved by a winch member (not shown) which is arranged on an upper side of an outer portion of a heating furnace. The winch member vertically moves the frame body 40 in a state of being arranged in the heating furnace.

For example, the weights 60 and the wires 70 are attached to the glass plate G in a state where the frame body 40 is temporarily fixed to the molding frame 20, and the support member 38 is arranged. The molding frame 20 in this state is arranged in the heating furnace, the frame body 40 is held by the winch member and released from provisional fixation, and the support member 38 is removed for use.

A procedure for subjecting the glass plate G to bending using the jig 10 will be described.

Figure 4:
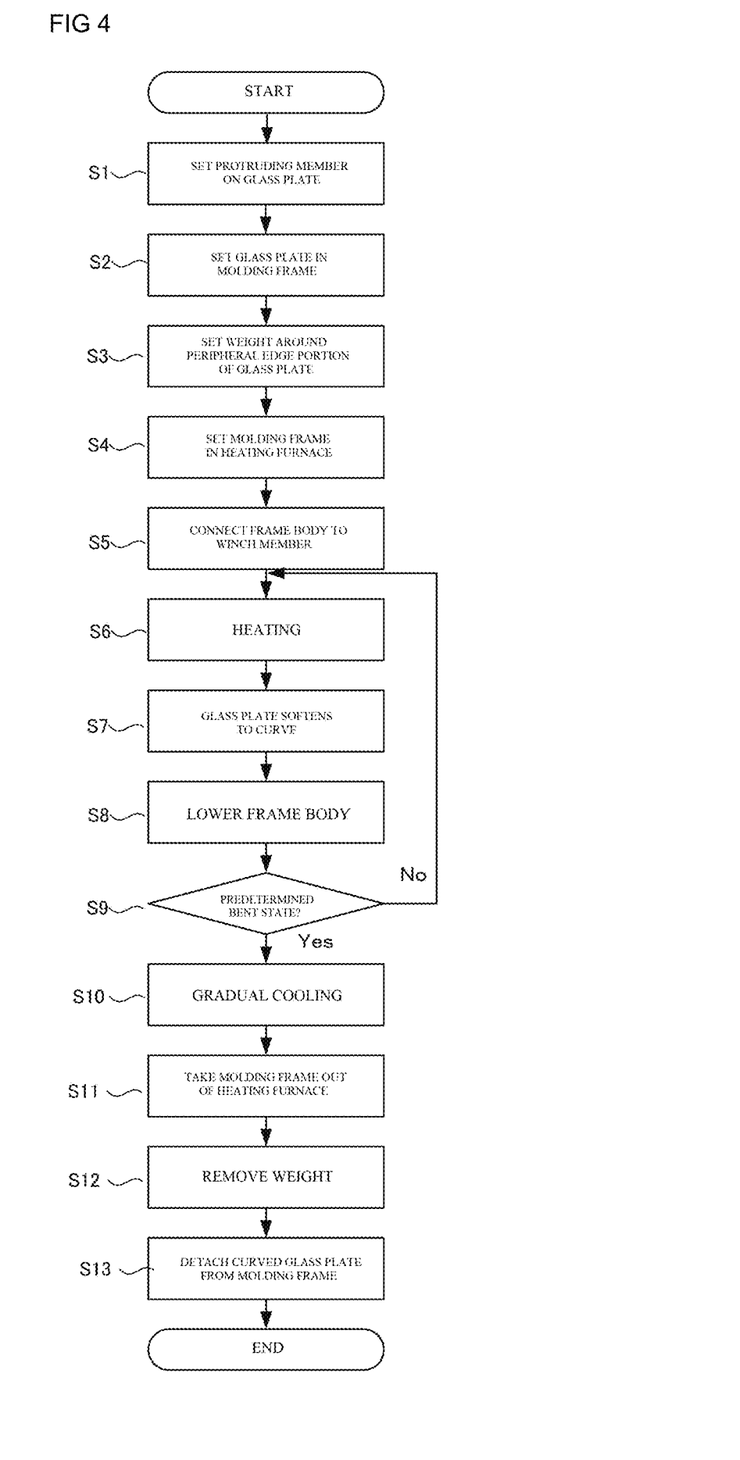
FIG. 4 is a flowchart showing a process for the glass plate bending method.

FIG. 4 is a flowchart showing a process for the glass plate bending method. FIGS. 5(a)-(e) illustrate schematic cross-sectional views taken along line A-A in FIG. 1(b) showing changes in a curved state of a glass plate with the passage of time in the glass plate bending method. FIGS. 6(a)-(e) illustrate schematic cross-sectional views taken along line B-B in FIG. 1(b) showing changes in the curved state of the glass plate with the passage of time in the glass plate bending method. FIGS. 7(a)-(e) illustrate illustrates schematic cross-sectional views taken along line C-C in FIG. 1(b) showing changes in the curved state of the glass plate with the passage of time in the glass plate bending method.

In the glass plate bending method according to the present embodiment, the protruding members 39 are set on the peripheral edge portion of the glass plate G (step S1). The glass plate G is then arranged in the molding frame 20 (step S2). As shown in FIG. 1(a), the four corners of the glass plate G are arranged at junctions of the arc-shaped frames 51, 52, 53, and 54. Since the peripheral edge portion of the glass plate G is away from the arc-shaped frames 51, 52, 53, and 54, the support member 38 is arranged at the center of the glass plate G to prevent breakage of the glass plate G.

The wires 70 are then attached to the peripheral edge portion of the glass plate G, and the weights 60 are further attached (step S3). At this time, the frame body 40 arranged on the molding frame 20 is provisionally fixed at a top position. The provisional fixation can be performed by arranging a plurality of rod-shaped members underneath the frame body 40. Tension in the planar direction is applied to the glass plate G by the weights 60 in this state, and the glass plate G does not break even if the support member 38 is removed.

The molding frame 20 with the glass plate G arranged therein in the above-described state is arranged in the heating furnace (step S4), and the winch member is connected to the frame body 40 (step S5).

The heating furnace is then brought into operation to put the glass plate G in a heated state (step S6). By setting a furnace temperature to, for example, 680° C. to 720° C., the glass plate G softens and starts to curve from a peripheral portion (step S7). The furnace temperature can be manually controlled while an internal state is observed.

The frame body 40 is then lowered by the winch member (step S8). When the frame body 40 is lowered while the interior of the furnace is kept at a predetermined temperature, the glass plate G bends with tension applied. When a predetermined bent state, that is, a predetermined radius is reached, the lowering of the frame body 40 and the heating are stopped (Yes in step S9). The lowering of the frame body 40 can be manually performed while the internal state is observed from outside the heating furnace.

The temperature of the heating furnace is gradually lowered (step S10). When the glass plate G reaches a predetermined temperature, the wires 70 are detached from the winch member, and the molding frame 20 is taken out of the heating furnace (step S11). The weights 60 are then removed (step S12), the curved glass plate G is detached from the molding frame 20 (step S13), and the process ends. With the above-described procedure, a concave glass plate which is a concave thermoplastic plate is completed.

A heating time period is roughly as follows. The temperature is gradually raised from room temperature to 580° C. In this state, the glass plate G starts to bend. The temperature is raised from 580° C. to 640° C. over about one hour. When the temperature reaches 640° C., about 80% of the glass plate G is bent. The temperature is kept at 640° C. for about 30 minutes, and the glass plate G is entirely bent. The temperature and the heating time period are appropriately changed depending on the size, the thickness, a bend radius, and the like of the glass plate G.

The states of the molding frame 20, the frame body 40, and the glass plate G in a state during bending will next be described.

Figure 5:
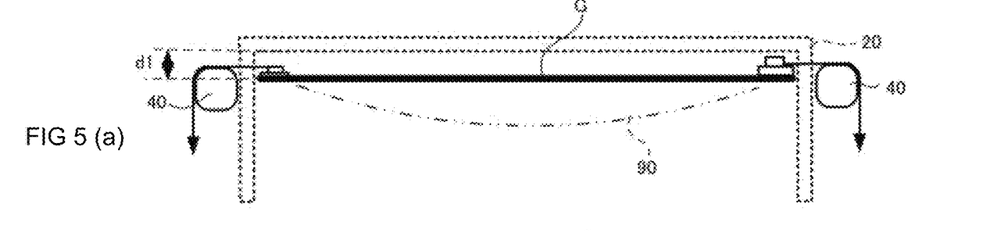
FIGS. 5(a)-(e) illustrate schematic cross-sectional views taken along line A-A in FIG. 1(b) showing changes in a curved state of the glass plate with the passage of time in the glass plate bending method.
Figure 6:
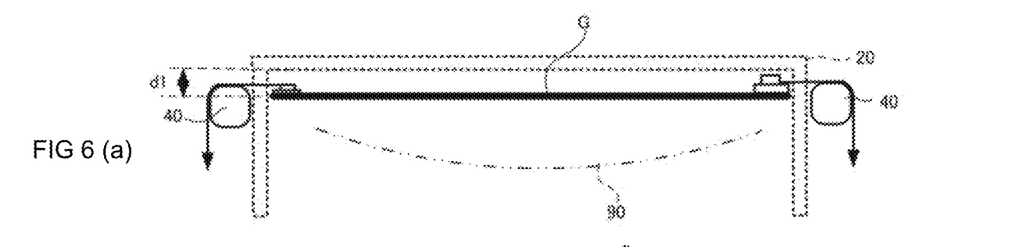
FIGS. 6(a)-(e) illustrate schematic cross-sectional views taken along line B-B in FIG. 1(b) showing changes in the curved state of the glass plate with the passage of time in the glass plate bending method.
Figure 7:
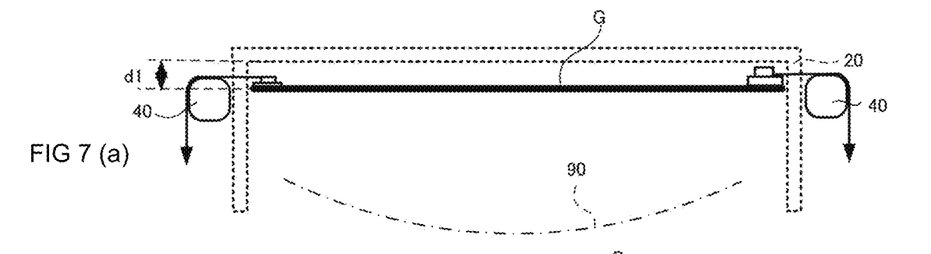
FIGS. 7(a)-(e) illustrate schematic cross-sectional views taken along line C-C in FIG. 1(b) showing changes in the curved state of the glass plate with the passage of time in the glass plate bending method.

In each of FIGS. 5, 6, and 7, parts (a) to (e) show changes with the passage of time, and drawings bearing the same letter of the alphabet show the states of the glass plate G, the frame body 40, and the molding frame 20 at a same time.

Since the rectangular glass plate G is worked on to have isotropically substantially uniform radii of curvature in the present embodiment, a bent state of the glass plate G is different for each of a plurality of planes (line A-A (a cross-section position A), line B-B (a cross-section position B), and line C-C (a cross-section position C) in FIG. 1(b)) along the long sides. The start of heating (a time period t0=0), a first state of the heating (after a lapse of a time period t1), a second state (after a lapse of a time period t2), a third state (after a lapse of a time period t3), and a fourth state (after a lapse of a time period t4) will be described below (t0<t1<t2<t3<t4).

<Start of Heating: Part (a) of FIGS. 5(a)-(e), 6(a)-(e), and 7(a)-(e)>

That is, in a state at the start of the heating (part (a) of FIGS. 5(a)-(e), 6(a)-(e), and 7(a)-(e)), the frame body 40 is at the top position, and the glass plate G is shaped like a flat plate at each cross-section position. Note that the glass plate G is assumed to be curved to a target 90 at each cross-section position (common to FIGS. 5(a)-(e), 6(a)-(e), and 7(a)-(e)). In this state, the frame body 40 is located at a distance d1 from a lower end of the upper frame body 21 of the molding frame 20.

<First State (Time Period t1): Part (b) of FIGS. 5(a)-(e), 6(a)-(e), and 7(a)-(e)>

In this state, the frame body 40 is located at a distance d2 (d2>d1) from the lower end of the upper frame body 21 of the molding frame 20. In the first state, at the cross-section position A shown in FIGS. 5(a)-(e), a periphery of the glass plate G is slightly curved, but a central portion is not curved. Since end edges of the glass plate G are held by the arc-shaped frames 51 and 52 at the cross-section position A, the frame body 40 is located lower than end portions of the glass plate G, and the wires 70 pull the glass plate G obliquely downward.

At the cross-section position B shown in FIGS. 6(a)-(e) and the cross-section position C shown in FIGS. 7(a)-(e), the glass plate G is linear. At each of the cross-section positions B and C, since end edges of the glass plate G are not in contact with the arc-shaped frames 51 and 52, the frame body 40 is located at substantially the same position as the end portions of the glass plate G, and the wires 70 horizontally pull the glass plate G.

<Second State (Time Period t2): Part (c) of FIGS. 5(a)-(e), 6(a)-(e), and 7(a)-(e)>

In this state, the frame body 40 is located at a distance d3 (d3>d2) from the lower end of the upper frame body 21 of the molding frame 20. In the second state (part (c) of FIGS. 5(a)-(e), 6(a)-(e), and 7(a)-(e)), at the cross-section position A shown in FIGS. 5(a)-(e), the glass plate G coincides with the target 90. At the cross-section position B, since the end edges of the glass plate G are held by the arc-shaped frames 51 and 52, the frame body 40 is located lower than the end portions of the glass plate G, and the wires 70 pull the glass plate G obliquely downward.

At the cross-section position C shown in FIGS. 7(a)-(e), the glass plate G is still linear. In this state, the frame body 40 is located at the distance d3 (d3>d2) from the lower end of the upper frame body 21 of the molding frame 20. At the cross-section position C, since the end edges of the glass plate G are not in contact with the arc-shaped frames 51 and 52, the frame body 40 is located at substantially the same position as the end portions of the glass plate G, and the wires 70 horizontally pull the glass plate G.

<Third State (Time Period t3): Part (d) of FIGS. 5(a)-(e), 6(a)-(e), and 7(a)-(e)>

In this state, the frame body 40 is located at a distance d4 (d4>d3) from the lower end of the upper frame body 21 of the molding frame 20. In the third state (part (d) of FIGS. 5(a)-(e), 6(a)-(e), and 7(a)-(e)), at the cross-section position A shown in FIGS. 5(a)-(e) and the cross-section position B shown in FIGS. 6(a)-(e), the glass plate G coincides with the target 90. At each of the cross-section positions A and B, since the end edges of the glass plate G are held by the arc-shaped frames 51 and 52, the frame body 40 is located lower than the end portions of the glass plate G, and the wires 70 pull the glass plate G obliquely downward.

At the cross-section position C shown in FIGS. 7(a)-(e), the periphery of the glass plate G is slightly curved, but the central portion is not curved. Since the end edges of the glass plate G are not in contact with the arc-shaped frames 51 and 52 at the cross-section position C, the frame body 40 is located at substantially the same position as the end portions of the glass plate G, and the wires 70 horizontally pull the glass plate G.

<Fourth State (Time Period t4): Part (e) of FIGS. 5(a)-(e), 6(a)-(e), and 7(a)-(e)>

In this state, the frame body 40 is located at a distance d5 (d5>d4) from the lower end of the upper frame body 21 of the molding frame 20. In the fourth state (part (e) of FIGS. 5(a)-(e), 6(a)-(e), and 7(a)-(e)), at all cross-section positions, that is, the cross-section position A shown in FIGS. 5(a)-(e), the cross-section position B shown in FIGS. 6(a)-(e), and the cross-section position C shown in FIGS. 7(a)-(e), the glass plate G coincides with the target 90.

Figure 8:
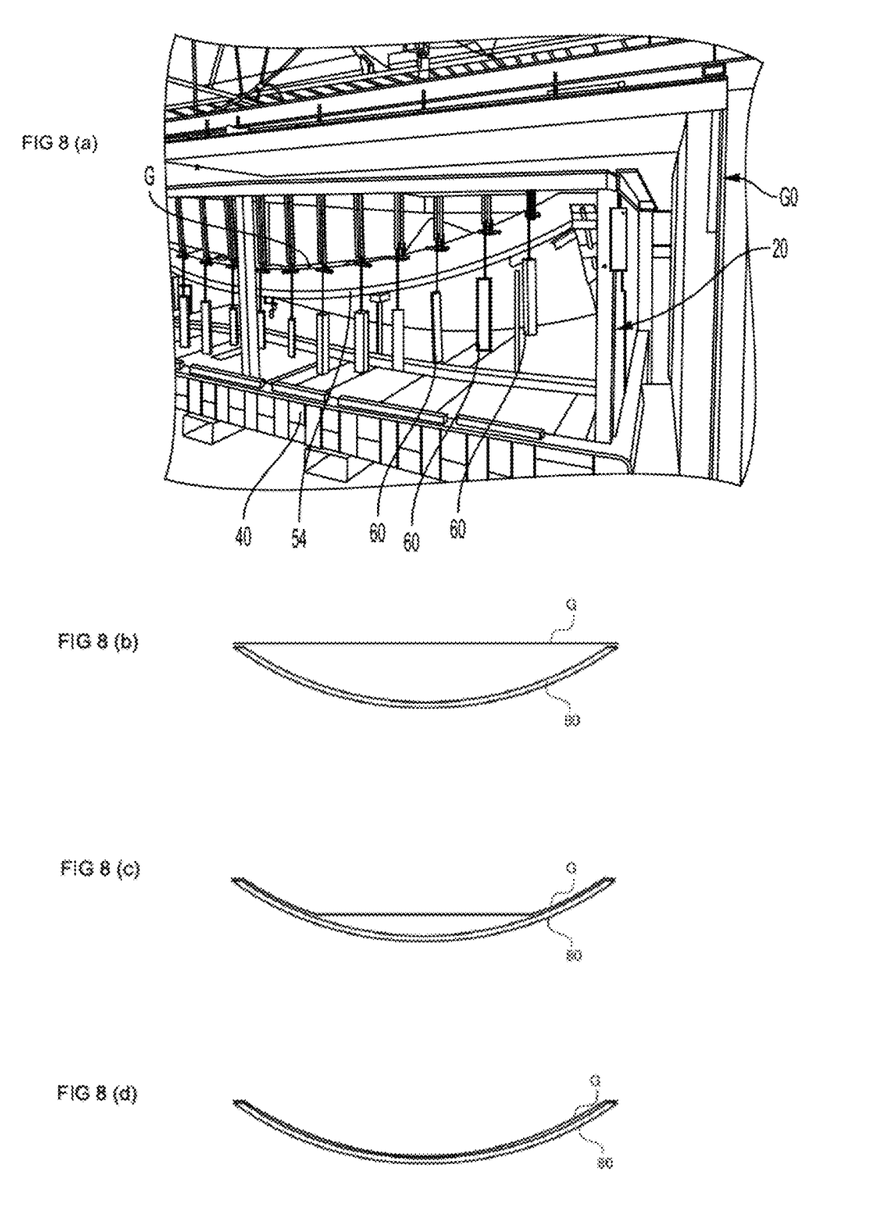
FIG. 8(a) is a photograph showing a bending completed state in the glass plate bending method.
FIGS. 8(b), 8(c), and 8(d) are schematic views showing, together with a concave mold, changes in a curved state of a glass plate with the passage of time in a glass plate bending method according to a second embodiment of the present invention.

In the above-described manner, the glass plate G is bent to a target shape. In this state, the glass plate G is gradually cooled, the glass plate G is taken out of the heating furnace together with the molding frame 20, and the bending ends. A state after the end of bending is shown in FIG. 8(a). FIG. 8(a) is a photograph showing a bending completed state in the glass plate bending method. FIG. 8(a) illustrates a state of being taken out of the heating furnace and shows part of the molding frame 20, the frame body 40, the weights 60, and the glass plate G after the bending that is a concave thermoplastic plate after working.

According to the glass plate bending method of the present embodiment, since the glass plate G is subjected to bending in the air without making contact with a mold or the like, a surface of the glass plate G does not have asperities, a scratch, or the like due to a surface state of the mold. Additionally, since the arc-shaped frames 51, 52, 53, and 54 are arranged in the molding frame 20 to define the shape of the peripheral edge portion of the glass plate G, the rectangular glass plate G can be subjected to bending to form part of a desired curved surface (paraboloid).

In addition, a giant paraboloid can be formed by bending a plurality of glass plates G to predetermined curved surfaces and appropriately combining the glass plates G. Even if the glass plate G that is an object of bending is thin, a problem, such as breakage of the glass plate G during bending, does not occur.

Second Embodiment

Note that, in a molding frame 20, a target concave mold 80 which is curved can be arranged below a glass plate G. FIGS. 8(b), 8(c), and 8(d) are schematic views showing, together with a concave mold, changes in a bent state of a glass plate with the passage of time in a glass plate bending method according to a second embodiment of the present invention.

In the second embodiment, the concave mold 80 forming a desired shape is arranged below the molding frame 20 that holds the glass plate G. The concave mold 80 determines the shape of the glass plate G that is heated and softens, and sags at a central portion under its self-weight and is deformed. This allows high-accuracy bending of the glass plate G. When many glass plates G are to be subjected to bending, control of various elements, such as temperature and the position of a frame body 40, can be more easily performed.

It is also possible to shape the glass plate G by bending the glass plate G without use of a concave mold, taking out the glass plate G, and putting the glass plate G on the concave mold and causing the glass plate G to follow the mold.

Note that although temperature control of the heating furnace and control of a lowering position and speed of the frame body 40 are manually performed in each of the above-described examples, control means for controlling the elements may be provided, and the control may be automatically performed by a procedure determined in advance. The temperature and the lowering speed and position of the frame body 40 can also be controlled in accordance with a curved state of the glass plate G.

Additionally, although the glass plate G has been described as a rectangle, a square one or a circular one can be adopted as an object. In this case, a molding frame and the like are fabricated to suit the glass plate G to be worked on. Although examples where the glass plate G is bent have been illustrated, a synthetic resin plate material of, for example, acrylic resin, epoxy resin, or polycarbonate resin can be adopted as a thermosoftening plate material, in addition to a glass plate.

INDUSTRIAL APPLICABILITY

A thermoplastic plate bending method, a working jig, and a concave thermoplastic plate according to the present invention have industrial applicability for the reasons below. Since a glass plate is pulled in a planar direction during heating, moderate tension acts on the glass plate to prevent breakage. The degree of curvature of glass can be adjusted by adjusting the mass of each weight. An accurate curved glass plate can be manufactured at a high yield.

DESCRIPTION OF REFERENCE NUMERALS

10: jig
20: molding frame
21, 22, 23, 24: upper frame body
25, 26, 27, 28: lower frame body
29, 30, 31, 32: vertical frame body
33, 34: lower portion reinforcing member
38: support member
39: protruding member
40: frame body
41, 42, 43, 44: frame material
51, 52, 53, 54: arc-shaped frame
60: weight
70: wire
80: concave mold

The invention claimed is:

1. A jig used at the time of putting a thermosoftening plate in a heated state and subjecting the thermosoftening plate to bending under a self-weight, the jig comprising:
   a frame body which is in contact with at least part of a peripheral edge of the thermosoftening plate and holds the thermosoftening plate; and
   tension generation means for pulling the peripheral edge of the thermosoftening plate and applying tension in a planar direction, wherein
   the tension generation means includes
   a plurality of weights which are arranged around the frame body,
   linear members which connect the weights and the peripheral edge of the thermosoftening plate, and
   a direction change member which is attached to the frame body and changes force in a vertical direction due to the weights, for which the linear members are arranged, into tensile force in the planar direction for the thermosoftening plate, and
   a furnace, wherein when the frame body is lowered into the furnace with a predetermined temperature, the thermosoftening plate bends with tensile force in the planar direction for the thermosoftening plate applied, and when the thermosoftening plate reaches a predetermined bent state having a predetermined radius, the lowering of the frame body and the heating of the furnace are stopped.

2. The jig according to claim 1, further comprising:
   a concave mold which is arranged below the frame body.

3. The jig according to claim 1, wherein
   magnitude of the tension is variable.

4. The jig according to claim 1, wherein
   the thermosoftening plate is a glass plate.

5. A thermosoftening plate bending method using the jug according to claim 4 for heating the thermosoftening plate to be subjected to bending which is horizontally arranged while holding the at least part of the peripheral portion of the thermosoftening plate, causing a portion inside the peripheral edge portion to sag under the self-weight, and bending the thermosoftening plate to the predetermined bent state having the predetermined radius, the thermosoftening plate bending method comprising:
   applying the tension in the planar direction of the thermosoftening plate via the plurality of weights at the time of holding the at least part of the peripheral edge portion of the thermosoftening plate.

6. The thermosoftening plate bending method according to claim 5, wherein
   a concave mold is arranged below the thermosoftening plate.

7. The thermosoftening plate bending method according to claim 5, wherein
   magnitude of the tension is variable.

8. The thermosoftening plate bending method according to claim 5, wherein
   the thermosoftening plate is a glass plate.

* * * * *